Figure 1:
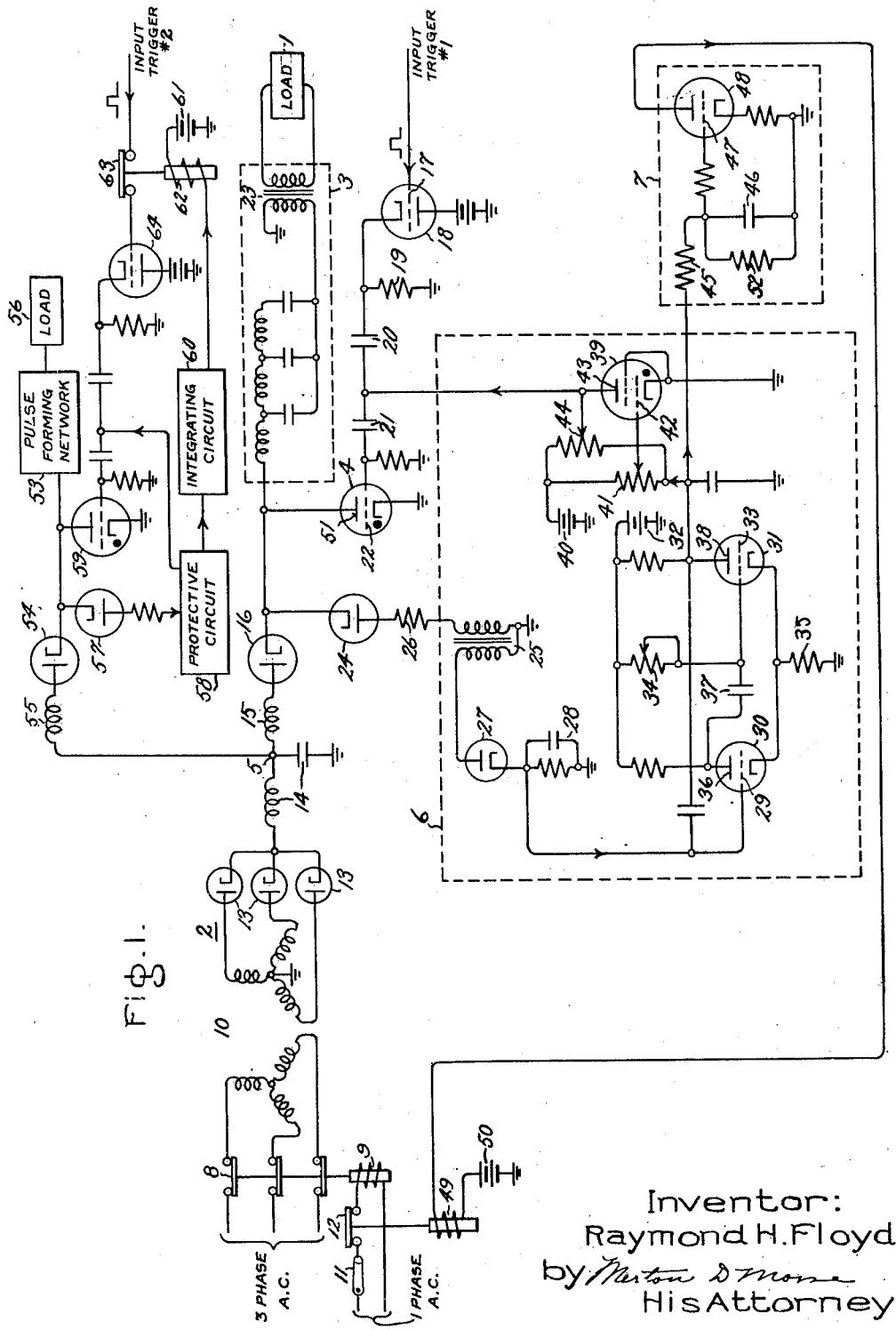

Nov. 10, 1953    R. H. FLOYD    2,659,008
ELECTRONIC CONTROL CIRCUIT
Filed Sept. 11, 1951    2 Sheets-Sheet 1

Inventor:
Raymond H. Floyd,
by Merton D. Moore
His Attorney.

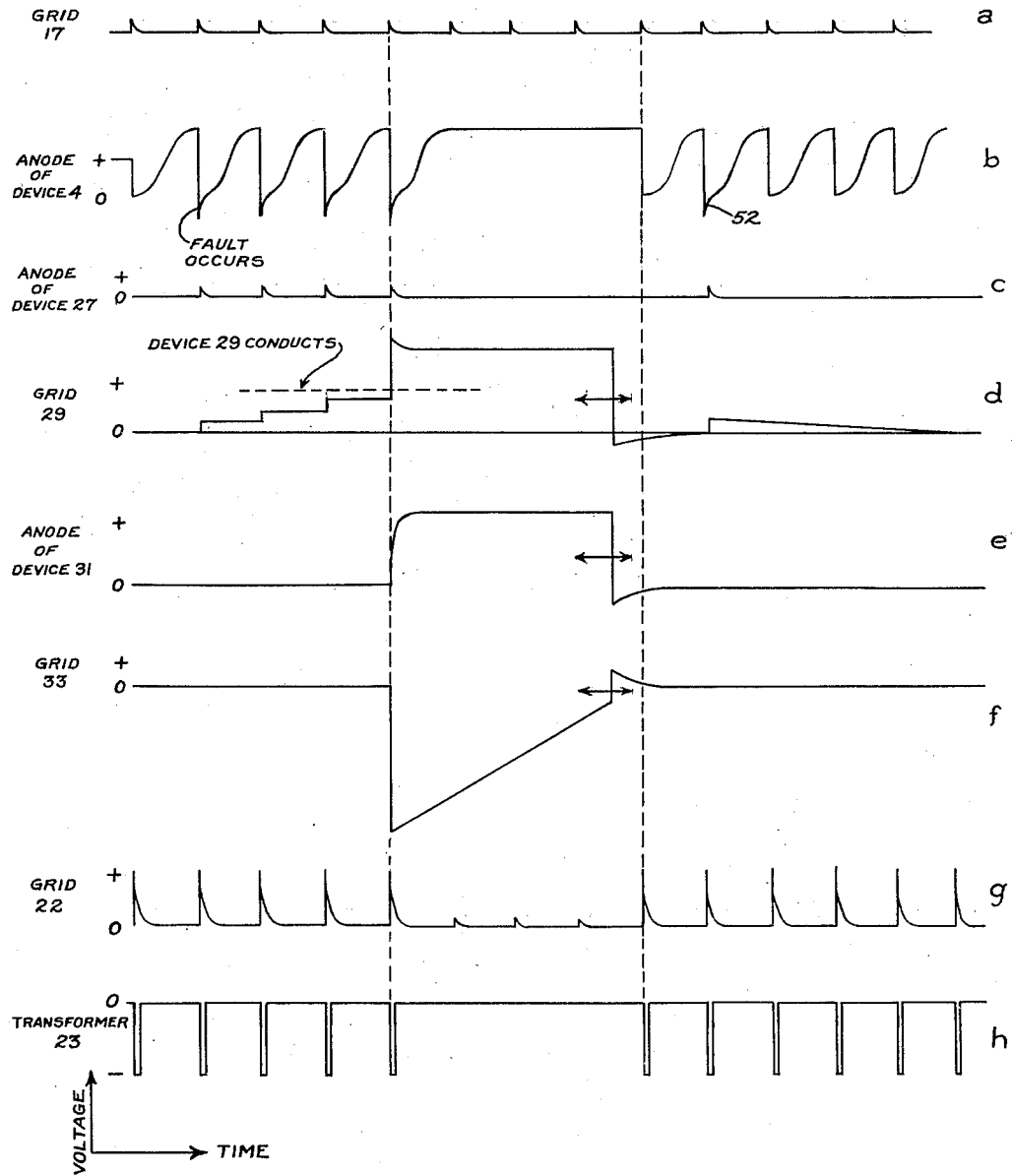

Patented Nov. 10, 1953

2,659,008

UNITED STATES PATENT OFFICE 2,659,008

ELECTRONIC CONTROL CIRCUIT

Raymond H. Floyd, Redondo Beach, Calif., assignor to General Electric Company, a corporation of New York Application September 11, 1951, Serial No. 246,077

8 Claims. (Cl. 250—36)

This invention relates generally to electrical control circuits and more particularly to arrangements providing a predetermined control action in response to faults occurring in an electrical load circuit.

In providing protective action for electrical circuits subject to instabilities expressed as abnormal electrical signal conditions such as voltage, current or frequency deviations from a given norm, a system which is reliable, flexible, fast-acting, as well as simple is to be desired. A protective problem oftentimes encountered when a plurality of load circuits are energized from a common source involves deenergization of the particular load circuit harboring an instability in response to the occurrence of a fault, followed by a subsequent reenergization; this sampling of the load circuit condition to continue until a predetermined number of faults have been detected at which time the load circuit is completely disconnected from the power source. A fast acting protective device of this sort is useful in protecting magnetron circuits generating high frequency power from undesirable impedance changes occurring in the magnetron circuit. These usually express themselves as a very low impedance, resulting from a gas discharge or sparking within the magnetron, or a very high impedance due to failure of the magnetron to oscillate in the proper manner, commonly referred to as mode changing. Either of these events may occur only once or twice per million pulses but when such an event occurs repeatedly, destructive voltage and current surges are reflected in the associated circuitry controlling energization of the magnetron.

An object of this invention is to provide an improved protective arrangement against electrical circuit instabilities.

Another object of the invention is to provide an improved protective arrangement for detecting instabilities occurring in a plurality of load networks energized from a power source, and for deenergizing the unstable load circuits upon persistence of the instability without interfering with the operation of the remaining load circuits.

Another object of the invention is to provide an improved electrical protective arrangement for a magnetron load circuit and associated circuitry.

Another object of the invention is to provide a novel protective arrangement for preventing operation of the switching apparatus feeding the output of a pulser network to a magnetron load circuit upon the persistent occurrence of instability in the magnetron circuit.

In accordance with one preferred embodiment of the invention, applicable to the operation of a magnetron load circuit from a pulse forming network, repeated instabilities in the magnetron load circuit reflected back through the pulse forming network operate a single shot multivibrator. The output of the multivibrator in turn operates a biasing circuit which halts operation of the switch device employed in discharging the pulse forming network into the load circuit for the duration of the multivibrator output wave. An integrating circuit operating from the output of the multivibrator is arranged to prevent further energization of the magnetron load circuit after a preset number of repeated instabilities.

The novel features which I believe characteristic of my invention are set forth with particularity in the appended claims. My invention, however, both as to its organization and method of operation, together with further objects and advantages thereof may best be understood by reference to the following description taken in connection with the accompanying drawings in which Fig. 1 shows in circuit diagram form a preferred embodiment of the invention applicable to a magnetron firing circuit, and Fig. 2 illustrates graphically the wave shapes encountered during one cycle of operation of the protective arrangement disclosed in Fig. 1.

Referring to Fig. 1, there is shown a load circuit 1, such as a magnetron oscillator, energized by applying three-phase alternating power through the rectifying circuit 2 to charge the pulse forming network 3. The charged pulse forming network, upon operation of switch device 4, discharges a substantially square wave of high voltage into the magnetron load circuit 1. On the first operating cycle, the network 3 charges to the full unidirectional voltage available at junction 5. When the switch device 4 conducts, the network discharges to zero voltage. The switch device 4 is immediately rendered non-conductive and the network recharges to twice the supply voltage at which time it is again completely discharged; succeeding cycles are the same. During sparking of the magnetron, however, its impedance is materially reduced. The effect of this reduced load impedance results in a mismatch of the magnetron load circuit and the pulse forming network with the result that the pulse forming network 3 is left with a residual negative charge. If this condition is permitted to recur, there results a non-uniform pulsing of the magnetron load circuit together with a possible destructive overloading of the associated circuitry.

To avoid recurrence of this condition, a protective circuit 6 is provided which interrupts the magnetron firing circuit before any damage is done, allowing the magnetron circuit to recover to a stable condition without interrupting operation except for a few pulses. This protective circuit is so arranged that mismatch in the load causes the switch device to be rendered inoperative, thereby halting energization of the magnetron load circuit. After a time interval determined by the time constant of the protective circuit, the switch device 4 is once again rendered operative. In the event the instability in the load circuit persists, an integrating circuit 7 operates to completely deenergize the magnetron load circuit.

The detailed functioning of the embodiment shown in Fig. 1 is as follows. The three-phase alternating power is applied over contactors 8, associated with relay 9, to the primary windings of the three-phase transformer 10. Relay 9 is normally energized because of single phase alternating power applied over switch 11 through the normally closed contact 12. The secondary windings of the three-phase transformer 10 are each coupled through respective rectifying devices 13 to the direct current filter network 14. The rectified voltage appearing at junction 5 is applied over charging reactor 15 and the charging diode 16 to the pulse forming network 3. The charging reactor 15 is resonant with the capacitance of the pulse forming network 3 to permit charging of the network to approximately twice the direct voltage available at junction 5. Under normal conditions with the switch device 4 inoperative, the pulse forming network 3 charges to substantially the full unidirectional potential existing at terminal 5. Switch device 4 comprises a gaseous discharge device having its gaseous discharge path connected across the pulse forming network 3. Upon the arrival of an incoming trigger pulse at the control electrode 17 of cathode follower 18, a positive voltage trigger is developed across cathode load resistor 19. This trigger is then applied through condensers 20 and 21 to the control electrode 22 of the switch device 4 causing it to conduct and provide a path for rapid discharge of the pulse forming network 3. Under normal conditions, the load circuit and the impedance of the pulse forming network are matched, such that upon discharge of the pulse forming network an extremely high voltage pulse is developed across the primary winding of the transformer 23 and induced in the secondary winding to operate the magnetron circuit 1. Upon discharge of the pulse forming network, gaseous discharge device 4 ceases to conduct and, since the incoming trigger has since disappeared, remains non-conductive, thereby permitting the pulse forming network to charge now to twice the potential of terminal 5. Subsequent pulsing of the magnetron circuit is therefore at twice the potential of terminal 5.

In the event that the magnetron load circuit becomes unstable, the impedance match between the load circuit and the pulse forming network no longer exists, such that instead of having all of the stored energy in the network 3 absorbed by the load circuit 1, a residual charge is retained in the pulse forming network. Charging diode 16 prevents the residual charge from leaking back into the direct current filter network 14 to cause undesirable oscillations which would effect magnetron operation. Since the residual charge is a signal of improper magnetron operation, it may be employed to control subsequent magnetron energization. In accordance with the invention, this residual charge, in the form of a negative voltage, is applied through the reverse current diode 24 to the primary winding of the isolation transformer 25 over load resistor 26. The resultant signal developed in the secondary winding of transformer 25 is applied through the diode 27 to charge the resistance capacitance time constant circuit 28. The long time constant of circuit 28 insures that part of the applied charge is retained for more than one pulsing period. This provides a voltage step effect at the grid 29, fed from the time constant circuit 28, if the load sparks repeatedly. Electron discharge devices 30 and 31, having their electron discharge paths energized from a source of positive potential 32, constitute a one shot multivibrator. Device 31 is normally conducting heavily because its grid 33 is connected through resistance 34 to the source 32, thereby biasing off device 30 due to electron discharge current flow through the common cathode load resistor 35. If the load sparking persists, then the time constant circuit 28 will charge up sufficiently to cause device 29 to conduct, thereby resulting in a voltage drop at anode 36. This negative going voltage is applied through condenser 37 to the grid 33 of device 31 to overcome the positive bias normally available over resistor 34 and cut off device 31. The voltage at the anode 38 of device 31 therefore rises. This positive going voltage at anode 38 exists for a predetermined time interval depending on the time constant of resistor 34 and condenser 37 and is employed to disable the gaseous discharge device 4 for the same interval.

Under normal conditions gaseous discharge device 39 is normally non-conductive with its gaseous discharge path connected between ground and through the condenser 21 to the control grid 22 of the switch device 4. Device 39 is held non-conductive by applying a negative potential from battery 40 through resistor 41 to the control electrode 42. The anode 43 of this device is also held at a slightly negative potential by the application of voltage from battery 40 over resistor 44. Thus, under normal conditions with device 31 conducting, sufficient negative voltage is maintained at the grid 42 and anode 43 of device 39 such that it is inoperative to effect control over device 4. However, upon operation of the multivibrator, a positive voltage of sufficient amplitude is developed at anode 38 to overcome the negative bias provided by battery 40, thereby driving the anode 43 and grid 42 of device 39 sufficiently positive to cause the gaseous discharge device 39 to conduct and thereby clamp the control electrode 22 of device 4 substantially at ground potential. This clamping action persists for the duration of the positive going pulse developed at anode 38 of device 31, such that any incoming trigger signals available from device 18 are routed to ground during this time interval and hence are ineffective to cause operation of device 4. The duration of inoperativeness of the switch device 4 is controllable by varying the adjustable resistor 34 in the multivibrator circuit. This has the effect of varying the rate at which grid 33 of device 31 is returned to a voltage sufficient to cause device 31 to once again become conductive.

Upon termination of the positive going pulse developed at anode 38, the multivibrator reverts to its original state with the result that the switch device 4 is again in condition to permit application of power to the magnetron load circuit 1 upon arrival of a trigger pulse from cathode follower 18.

The instabilities in a magnetron circuit may usually be halted by removing the magnetron firing voltage for a short time interval and then switching it back on. It may be necessary to repeat this operation a number of times before the magnetron operates under stable conditions. The protective circuit shown in Fig. 1 is capable of providing this function satisfactorily. However, it is possible that in time the magnetron becomes defective with the result that the instability persists, and it becomes desirable to switch off the magnetron firing voltage. Accordingly, an integrating circuit 7 is provided. Repeated operation of the multivibrator circuit comprises devices 30 and 31, in response to persistent instabilities in the magnetron load circuit, results in the generation of repeated positive going voltage waves at the anode 38 of device 31. These positive going voltage waves are integrated by resistor 45 and condenser 46, which are so dimensioned that after a given number of operations of the multivibrator, sufficient voltage is developed across condenser 46, and hence available at control electrode 47, to cause conduction of device 48. Device 48 is normally arranged to be non-conductive with the result that the relay winding 49 in its anode circuit is normally unenergized thereby retaining contactor 12 associated with it in its normally closed position. However, upon conduction of device 48, current flows through the electron discharge path of device 48 from battery 50, energizing the relay winding 49 which causes contacts 12 to open. Thereupon, relay winding 9 is deenergized, resulting in contactors 8 falling out, and hence disconnecting the three phase power from the rectifier circuit 2. This completely disables the magnetron firing circuit.

The number of trial closures of the switch device 4 occurring before the operation of relay 49 to completely disable the magnetron firing circuit can be controlled through the choice of resistor 45 and condenser 46. Thus, increasing the time constant of this combination increases the number of lockouts of switch device 4 occurring before operation of the lockout relay 49. Resistor 52 in parallel with condenser 46 is for the purpose of permitting condenser 46 to discharge gradually after the operation of lockout relay 49 so that after a suitable time, the recycling apparatus may be put into operation again. The apparatus is thus automatically reset to operate again whenever required. The length of this resetting time interval may be controlled through the choice of resistor 52. A switch 11 permits deenergization of relay 9, thereby permanently halting magnetron firing.

The effectiveness of the arrangement of Fig. 2 in controlling the recycling operation of the magnetron firing circuits is clearly shown by reference to Fig. 2 of the drawings wherein the voltage wave shapes encountered at various points in the circuit are plotted as ordinates and time as the abscissae. Graph "a" illustrates the recurrent trigger pulses applied to the switch tube 4 for controlling magnetron firing. Graph "b" illustrates the resultant charge and discharge voltage of the pulse forming network developed at the anode 51 of switch device 4. Thus, the pulse forming network originally charged to substantially the full potential at terminal 5 is discharged to zero voltage upon arrival of the first trigger pulse at the switch device 4 which renders it conductive. Immediately upon discharge, the pulse forming network charges up to twice the potential at terminal 5 as previously explained. Thereafter under normal operation the pulse forming network charges to twice the voltage of terminal 5 and discharges to zero voltage during each trigger pulse period. However, in the event sparking of the magnetron occurred at the time of the second discharge of the pulse forming network, the resultant negative residual charge left in the network is discharged by the reverse current diode 24 through load resistor 26 and the following circuitry. Repeated discharges of the residual charge in network 3 by diode 24 results in the positive going voltage pulses shown in graph "c" being developed at the anode of diode 27. Diode 27 conducts during these positive occurrences to charge up the network 28 in steps as shown in graph "d." Upon four occurrences of the pulses of graph "c," the voltage across the network 28 and hence also at grid 29 is sufficient to cause device 29 to conduct and generate a multivibrator square wave of a duration shown in graph "e." By varying the dimensioning of resistor 34 and condenser 37 the width of the square wave may be varied as shown by the double headed arrow. The positive going square wave is employed to by-pass the trigger pulses applied to switch device 4 to ground for the duration of the square wave. This is shown in graph "g," where during the positive pulse period of graph "e" the trigger pulses applied to the grid of device 4 are substantially eliminated. With device 4 maintained inoperative, no discharge of the pulse forming network can occur and hence the voltage across the network is held fixed as shown in graph "b" and no firing pulses are delivered to the magnetron from transformer 23 as shown in graph "h." Upon termination of the positive going square wave of voltage shown in graph "e," occurring when the voltage at grid 33 of the multivibrator device 31 shown in graph "f" has risen under control of resistor 34 and condenser 37 to permit device 31 to conduct once again, the switch device 4 is able to be made conductive by arrival of a trigger pulse as shown in graph "g." Thereafter operation of the magnetron firing circuits is normal. It should be noted that a single fault occurring at the time 52 is insufficient to render the multivibrator operative for halting magnetron firing.

The protective circuit disclosed in Fig. 2 provides a control system which is all electronic and hence devoid of the inertia effects of mechanical arrangements. Moreover, it lends itself readily to time adjustments providing greater operational flexibility than previous systems. Also, referring again to Fig. 1, a second magnetron firing circuit may be operated from the same source of alternating power while permitting independent control of the magnetron firing circuits by means of independent control of respectively associated switch devices. Thus, pulse forming network 53 connected to terminal 5 through diode 54 and charging reactor 55 feeds its respective load circuit 56. Any instabilities in the magnetron load circuit 56 are reflected through the associated pulse forming network

53 and applied through a respective reverse current diode 57 to a protective circuit 58 similar to protective circuit 6. The output of protective circuit 58 is employed to control operation of a respective switch device 59 similar to that of switch device 4. An integrating circuit 60, associated with protective circuit 58 may be employed to energize the lockout relay 49, thereby removing the three phase power supplied to the various load circuits. However, where several magnetron load circuits are being supplied, it is desirable to prevent interference of one recycling control circuit on the other. Accordingly, the integrating circuit is employed to halt the application of trigger pulses to its associated switch device rather than to cut off the source of high voltage to all of the load circuits. By way of example, the integrating circuit 60, when rendered conductive after a given number of faults, causes battery 61 to energize relay winding 62. This causes the normally closed contactor 63 supplying trigger pulses to cathode follower 64 to open and prevent further trigger pulses from being delivered to switch device 59. Thus, where one power supply drives several modulator stages, applicant's arrangement provides cut-off of any individual modulator stages without interfering with operation of the others.

While a specific embodiment has been shown and described, it will, of course, be understood that various modifications may be made without departing from the invention. The appended claims are therefore intended to cover any such modifications within the true spirit and scope of the invention.

What I claim as new and desire to secure by Letters Patent of the United States is:

1. In an impulse system including a load device, a pulser for causing energy pulses to be supplied to said load device and a power source for energizing at least a portion of said system, a protection circuit comprising means coupled to said system for deriving a control potential in response to an abnormality occurring therein during a predetermined number of operating pulses, means responsive to said control potential for disabling said pulser for a time interval of preselected duration thereby to interrupt the supply of energy pulses to said load device during said time interval, and means responsive to a given characteristic of said control potential for interrupting the supply of energy from said power source to said portion of said impulse system.

2. In an impulse system including a load device, a pulser for causing energy pulses to be supplied to said load device and a power source for energizing at least a portion of said system, a protection circuit comprising means coupled to said system for deriving a control pulse in response to an abnormality occurring therein during a predetermined number of operating pulses, means responsive to said control pulse for disabling said pulser for a time interval corresponding to the duration of said control pulse thereby to interrupt the supply of energy pulses to said load device during said time interval, and means responsive to a preselected number of recurrences of said control pulse in a given interval of time for interrupting the supply of energy from said power source to said portion of said impulse system.

3. In an impulse system including a load device, a pulser for causing energy pulses to be supplied to said load device and a power source for energizing at least a portion of said system, a protection circuit comprising an integrator coupled to said system for deriving a first control potential in response to an abnormality occurring therein, said first control potential having a magnitude dependent upon the number of operating pulses over which said abnormality occurs, a trigger circuit coupled to said integrator for deriving a second control potential in response to a predetermined characteristic of said first control potential, means responsive to said second control potential for disabling said pulser for a time interval of preselected duration thereby to interrupt the supply of energy pulses to said load device during said time interval, and means responsive to a given characteristic of said second control potential for interrupting the supply of energy from said power source to said portion of said impulse system.

4. In an impulse system including a load device, a pulser for causing energy pulses to be supplied to said load device and a power source for energizing at least a portion of said system, a protection circuit comprising an integrator coupled to said system for deriving a first control potential in response to an abnormality occurring therein, said first control potential having a magnitude dependent upon the number of operating pulses over which said abnormality occurs, a multivibrator having an input circuit coupled to said integrator and an output circuit for deriving a second control potential including one pulse of adjustably fixed duration in response to each occurrence of a preselected magnitude in said first control potential, means responsive to said second control potential for disabling said pulser for a time interval corresponding to the occurrence of each pulse in said second control potential thereby to interrupt the supply of energy pulses to said load device during said time interval, and means responsive to a given characteristic of said second control potential for interrupting the supply of energy from said power source to said portion of said impulse system.

5. In an impulse system including a load device, a pulser for causing energy pulses to be supplied to said load device and a power source for energizing at least a portion of said system, a protection circuit comprising means coupled to said system for deriving a control potential in response to an abnormality occurring therein, said control potential including one pulse for each occurrence of a predetermined number of operating pulses during which said abnormality occurs, means responsive to said control potential for disabling said pulser for a time interval of preselected duration thereby to interrupt the supply of energy pulses to said load device during said time interval, and a relay circuit including an input circuit having storage means and an actuated circuit having electrical circuit making and breaking means in interposed circuit relation between said power source and said portion of said system, said relay circuit being responsive to a given number of pulses of said control potential for actuating said circuit making and breaking means to interrupt the supply of energy from said power source to said portion of said impulse system.

6. In an impulse system including a load device, a pulse-forming element coupled to said load device, a power source for charging said element with energy and a pulser for periodically discharging said pulse-forming element thereby causing energy pulses to be supplied to said load device, said load device being subject to an abnormality wherein an abnormal potential of a polarity opposite to that normally occurring appears at said pulse-forming element, a protection circuit comprising means coupled to said pulse-forming element for deriving a control potential in response to said abnormal potential occurring therein during a predetermined number of operating pulses, means responsive to said control potential for disabling said pulser for a time interval of preselected duration thereby to interrupt the supply of energy pulses to said load device during said time interval, and means responsive to a given characteristic of said control potential for interrupting the supply of energy from said power source to said pulse-forming element of said impulse system.

7. In an impulse system including a load device, a pulser for causing energy pulses to be supplied to said load device and a power source for energizing at least a portion of said system, a protection circuit comprising means coupled to said system for deriving a control potential in response to an abnormality occurring therein during a predetermined number of operating pulses, means responsive to said control potential for disabling said pulser for a time interval of preselected duration thereby temporarily to interrupt the supply of energy pulses to said load device during said time interval, and means responsive to a given characteristic of said control potential for interrupting the supply of energy from said power source to said portion of said impulse system during an interval of time much greater in length than the aforesaid time interval.

8. In an impulse system including a magnetron, a delay line coupled to said magnetron, a power source for charging said delay line with energy and a pulser for periodically discharging said delay line thereby causing energy pulses to be supplied to said magnetron, said magnetron being subject to an abnormality wherein an abnormal potential of a polarity opposite to that normally occurring appears at said delay line, a protection circuit comprising an integration circuit including a unidirectionally conductive device responsive substantially only to said abnormal potential and storage means coupled to said device for deriving a first control potential in response to said abnormality occurring in said magnetron, said first control potential having a magnitude dependent upon the number of operating pulses over which said abnormality occurs, a trigger circuit coupled to said storage means of said integration circuit for deriving a second, pulse-type control potential in response to a predetermined magnitude of said first control potential, a gaseous discharge device having an output circuit coupled to said pulser and an input circuit coupled to said trigger circuit, said gaseous discharge device being arranged to fire in response to said second control potential thereby disabling said pulser for a time interval corresponding to the duration of the pulse in said second control potential to interrupt the supply of energy pulses to said magnetron during said time interval, and a relay circuit including an input circuit having storage means and an actuated circuit having electrical circuit making and breaking means in interposed circuit relation between said delay line and said power source, said relay circuit being responsive to a preselected number of recurrences of the pulse of said second control potential for interrupting the supply of energy from said power source to said portion of said impulse system.

RAYMOND H. FLOYD.

References Cited in the file of this patent
UNITED STATES PATENTS

| Number | Name | Date |
| --- | --- | --- |
| 2,165,848 | Gothe | July 11, 1939 |
| 2,405,237 | Ruhlig | Aug. 6, 1946 |
| 2,438,962 | Burlingame | Apr. 6, 1948 |
| 2,469,977 | Morrison | May 10, 1949 |
| 2,567,744 | Stanton | Sept. 11, 1951 |